April 11, 1967     H. MÜLLER     3,313,229

GAS HOOD

Filed July 19, 1965

INVENTOR

Hermann Müller

BY Bailey, Stephens and Huettig
ATTORNEYS 3,313,229
GAS HOOD
Hermann Müller, Frankfurt am Main, Germany, assignor to Metallgesellschaft Aktiengesellschaft, Frankfurt am Main, Germany
Filed July 19, 1965, Ser. No. 473,053
Claims priority, application Germany July 23, 1964, M 61,854
3 Claims. (Cl. 98—115)

This invention relates to a gas hood and, in particular, to a means for removing air or gas from vibro-screens, vibro-feeders and sinter band pans by means of suction.

Suction hoods have been used for removing dust raised by vibro-screens, vibro-feeders or from sinter pans in order to carry the dust and gas to a cleaner, such as electric filters. Such a suction hood is usually in the form of a funnel of round or angular cross-section and having a suction pipe connected to its center. Although such a hood completely covers the source of dust, nevertheless an air space exists between the lower edge of the hood and the source of the dust through which air flows. Preferably electric filters are used for the removal of dust from sinter bands or the sifting of hot materials and from other material transporting devices. However, electric filters, under certain high temperature conditions, perform badly in precipitating the dust. Consequently, attempts have been made to reduce the temperature of the dust as much as possible by means of drawing in large amounts of atmospheric air. This creates the disadvantage that the amount of gas that has to be cleaned in the filter becomes very large and increases the size of the electric filter to an uneconomical value for handling such large amounts of gas. For example, in the removal of the dust from the sifting of hot materials, approximately 6 to 10 cubic meters per second of suction air are required depending upon the size of the apparatus. With regard to the entire installation, this amounts to about 10%.

When working with waste gas temperatures of about from 200 to 250° C. as in actual practice, such decisively influences the entire system and necessitates various passages in the pipe line system for creating the uniform temperature in the electric gas filter. In the conventional suction hoods above the source of dust, the outside air enters with a temperature of about 20° C. However, as the suction pipe is positioned at the center of the hood, the entry of air is forced to pass over the heated material and thus becomes heated to such an extent as is undesirable in the following electric filter.

The object of this invention is to reduce the gas temperature of the gas emitted from the hot material zone, such as existing in vibro-screens, vibro-feeders pan conveyors and sintering bands. In general, this object is obtained by removing the hot gas and dust over the upper edges of the vessel containing the hot material, with the gas flowing into a dust collecting passageway and adding fresh air to this passageway. In this invention, the hood is provided with plates forming the gas passageway above the side walls of the vessel containing the hot material instead of having a centrally located suction pipe. The lower edges of these plates are spaced from the upper edges of the vessel containing the hot material so that a first slot is formed for the passage of the dust-laden gases from the vessel into the gas passageway and a second slot formed for the entry of fresh air. The fresh air at a temperature of about 20° C. enters the second slot and acts as a barrier against the escape of dust and enters the gas passageway without passing over the hot material beneath the hood. In the gas passageway it is mixed with the hot dust-containing gases and the mixture then flows into an exhaust duct. The gas mixture in the suction duct has a temperature of from about 100 to 150° C. which is a significant reduction of about 100° C. from the heretofore used hoods. Relative to the entire suction system, this means that a reduction of about 10° C. is obtained and which would be otherwise possible only by drawing in 10 to 12 cubic meters per second of fresh air and by an enlarged gas filter.

The apparatus of this invention is adaptable to pan conveyors as well as for vibro-screens and vibro-feeders. The removal of air and dust through the slots formed above the side walls of the hot material carrying vessels has the advantage that the minimum amount of fresh air required is taken in the gas passageway through a slot which can be adjusted for the entry of the required amount of fresh air and while the fresh air prevents the escape of dust. The temperature of the gases being fed to the electric filter are always lower than heretofore and the dust precipitation is more efficient.

The means by which the objects of the invention are otbained are described more fully with reference to the accompanying drawings in which.

Figure 1:
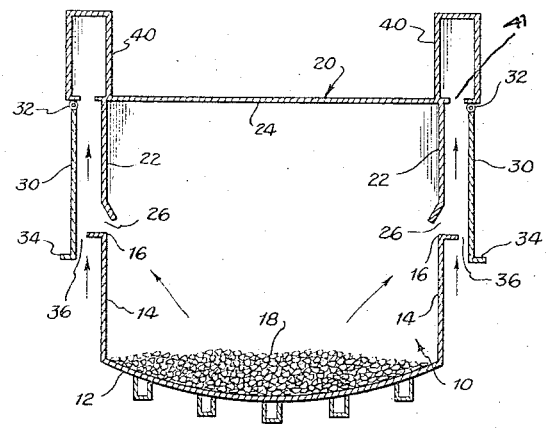
FIGURE 1 is a vertical cross-sectional view through a vibro-screen or a vibro-feeder.

In FIGURE 1, the vessel 10 for example a vibro-screen has a perforated bottom 12 and side walls 14 having upper edges 16. The vessel 10 contains the hot material 18 emitting hot dust-laden gases rising as indicated by the arrows.

Mounted above the vessel 10 is a hood 20 composed of hood plates 22 extending upwardly above the upper edges 16 with the plates being joined by a roof 24. As the lower edges of the plates 22 are spaced about the upper edges of the vessel 10, a first slot 26 is formed for the escape of dust-laden gases from vessel 10. Damper plates 30 are hung from roof of hood 20 by means of hinges 32. These damper plates are spaced from plates 22 to form a gas passageway and have their lower edges 34 at a lower level than the upper edges 16 of the vessel 10. Thus a second slot 36 is formed for the entry of fresh air into the gas passageway between plates 22 and 30. The amount of fresh air being taken in the slots 36 is controlled by adjusting the width of the slots 41 in the bottom of the exhaust duct 40.

Mounted on the roof above plates 22 and 30 are exhaust gas ducts 40 which lead to a dust filter such as an electric filter.

Slots 26 communicate directly with the interior of vessel 10 whereas second slots 36 communicate only with the outside atmosphere so that fresh air entering the slots 36 cannot be heated inside of vessel 10 or beneath hood 20. A suction applied to ducts 40 draws the hot dust-laden gases through the first slots 26 and fresh air through second slots 36. The hot gases are therefore cooled by the entering fresh air and the thus cooled mixture of gases drawn through exhaust ducts 40 to the dust separator. The amount of entering fresh air can be controlled by adjusting the damper plate 30.

Figure 2:
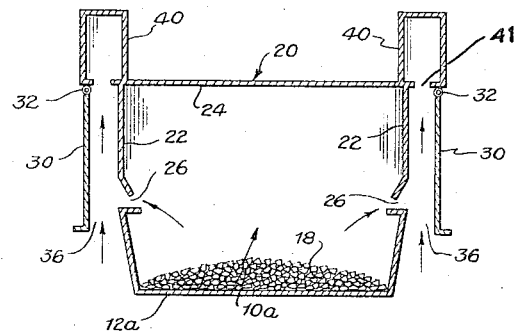
FIGURE 2 is a similar view of a modified form of the invention using a vessel composed of a pan conveyor.

In the modification of FIGURE 2, the hood 20 is the same as shown in FIGURE 1. However, the vessel 10a has an imperforate bottom 12a such as used in a pan conveyor. The withdrawal of the gases from vessel 10a and the cooling of the gas with fresh air is the same as in FIGURE 1.

Having now described the means by which the objects of the invention are obtained,

I claim:

1. In combination with a vessel having a bottom and side walls and adapted to hold hot material emitting gases containing dust, a hood for removing the gases comprising hood plates each being an upwardly extending hood plate mounted above and spaced from the upper edge of each vessel side wall for forming a first slot for the passage of gases, damper plate means mounted on said hood outwardly of the upwardly extending hood plate for forming therebetween a gas passageway, said damper plate means extending below the upper edge of the vessel and being adjustably spaced therefrom for forming a second slot for the entry of variable quantities of cooling air into said passageway, an exhaust gas duct joined to the upper end of the passageway for the removal of the gas and cooling air, and a roof between the upwardly extending hood plates.

2. In the combination of claim 1, said first slot being in direct communication with the interior of said vessel.

3. In the combination of claim 2, said upwardly extending hood plates further serving to contain the heat in said hood.

References Cited by the Examiner

UNITED STATES PATENTS

| | | | |
|---|---|---|---|
| 1,842,941 | 1/1932 | Keogh | 126—299 |
| 1,989,270 | 1/1935 | Clark | 98—115 |
| 2,014,962 | 9/1935 | Bramson | 98—115 |
| 2,845,882 | 8/1958 | Bratton | 110—8 |

ROBERT A. O'LEARY, *Primary Examiner.*

M. A. ANTONAKAS, *Assistant Examiner.*